H. E. GREEN.
SUPPORT FOR PICTURES, PLAQUES, AND SIMILAR ARTICLES.
APPLICATION FILED JAN. 10, 1919.

1,339,703.   Patented May 11, 1920.
2 SHEETS—SHEET 1.

Harry E. Green, Inventor.

By Lancaster and Allwine
his Attorneys

H. E. GREEN.
SUPPORT FOR PICTURES, PLAQUES, AND SIMILAR ARTICLES.
APPLICATION FILED JAN. 10, 1919.
1,339,703.
Patented May 11, 1920.
2 SHEETS—SHEET 2.
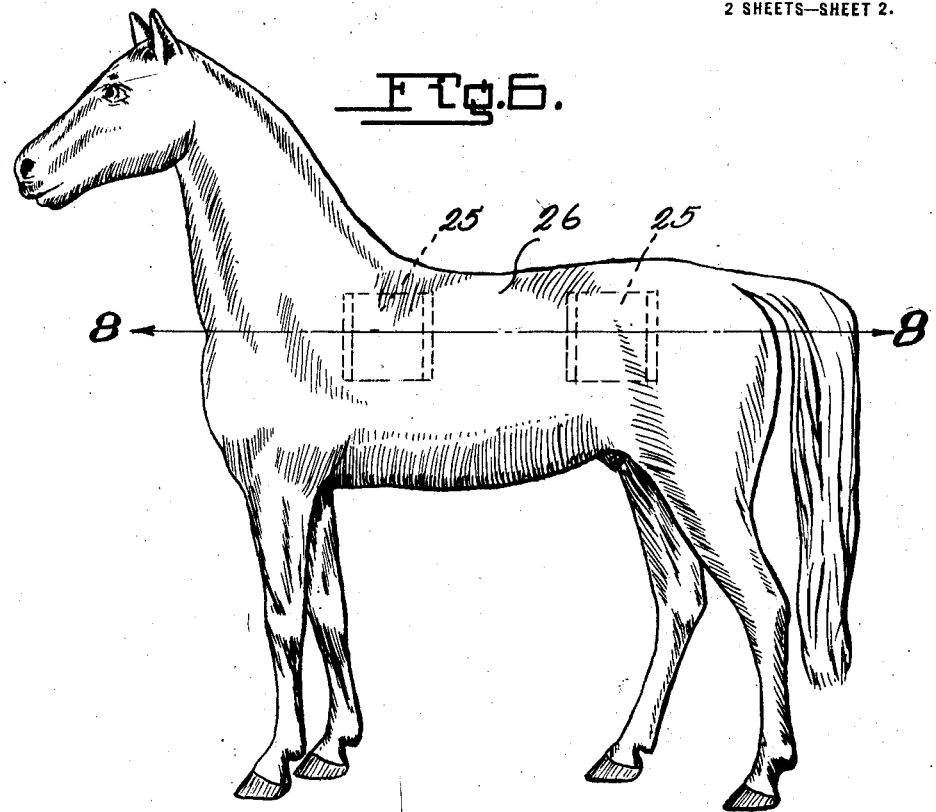
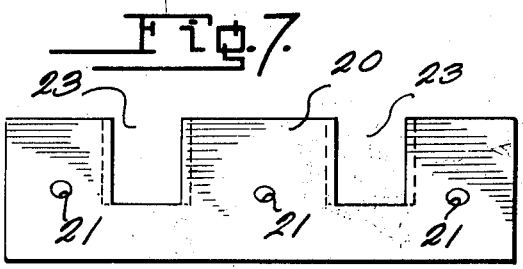
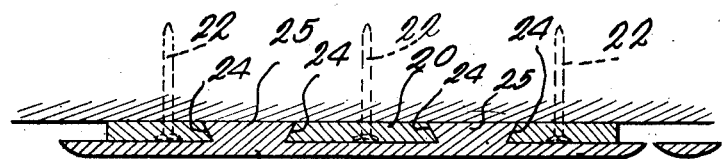
Harry E. Green.
Inventor

UNITED STATES PATENT OFFICE.

HARRY E. GREEN, OF ST. JOHN, NEW BRUNSWICK, CANADA.

SUPPORT FOR PICTURES, PLAQUES, AND SIMILAR ARTICLES.

1,339,703.  Specification of Letters Patent.  Patented May 11, 1920.

Application filed January 10, 1919. Serial No. 270,526.

*To all whom it may concern:*

Be it known that I, HARRY E. GREEN, a subject of the King of Great Britain, residing at St. John, in the Province of New Brunswick and Dominion of Canada, have invented certain new and useful Improvements in Supports for Pictures, Plaques, and Similar Articles, of which the following is a specification.

This invention relates to supports for pictures, plaques, or similar articles and an object of the invention is to provide, in a support structure as specified, a main supporting member, which may be securely attached to a wall or other permanent support and to which a plaque section conforming with the main supporting portion to provide an artistic appearance, or any suitable article may be easily and quickly attached.

Another object of this invention is to provide, a support for pictures or like articles, the main supporting structure of which is provided with a transversely extending groove adapted to receive therein a portion of the picture wire or cord which in turn supports the picture, and to provide removable artistic sections of the support which, when connected to the main supporting section or member of the support will form a closure for the upper portion of the groove and prevent the picture wire or cord from accidentally slipping out of the groove.

More specifically, the invention comprehends the provision of a support as specified which comprises the main supporting or attaching section which includes a nail or other suitable attaching member diagonally therethrough for securely attaching the attaching section or main supporting section of the support to a wall or permanent support; to provide a plurality of upwardly extending plates upon the attaching sections, the inner facing edges of which are spaced and beveled to form a dove-tailed groove which receives the dove tail carried by the removable section of the support, thereby providing a firm and secure connection between the attaching and artistic sections of the support by means of which they may be quickly and easily connected and disconnected.

Other objects of the invention will appear in the following detailed description, taken in connection with the accompanying drawings, forming a part of this specification and in which drawings:

Fig. 6 is a face view of a modified form of the support, showing a plaque.

Fig. 7 is a side elevation of the supporting structure or section used for supporting the plaque as shown in Fig. 6, and Fig. 8 is a horizontal section on the line 8—8 of Fig. 6 showing the plaque supported by the supporting section.

Figure 4:
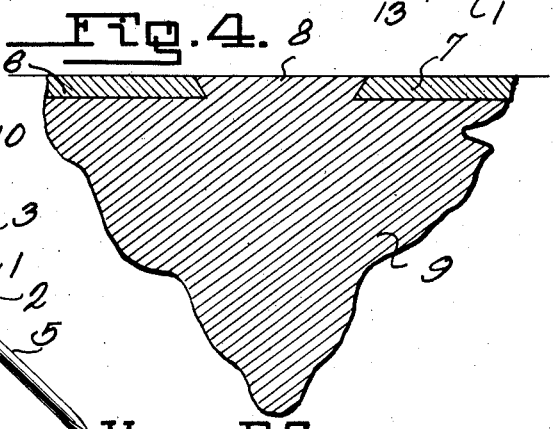
Fig. 4 is a horizontal section on the line 4—4 of Fig. 1.

Referring more particularly to the drawings, 1 indicates the main supporting or attaching section of the support which has its rear surface flat for facial abutment with a wall or other permanent support to which the same may be attached. The section 1 of the support is provided with a diagonally extending opening 2 which opens out into the upper inclined space 3 of the section. The upper end of the bore 2 is preferably counter sunk as shown at 4 to receive the head of a nail, screw or other analogous attaching device which may be forced through the opening 2 for connecting the section 1 to a wall or other permanent device. A pair of flat vertically extending arms 6 and 7 are formed upon the section 1 at the rear end of its upper inclined face 3 and these arms are spaced from each other as clearly shown in Fig. 4 of the drawings. The facing edges of the arms 6 and 7 are oppositely beveled to form a dove-tailed screw, which receives therein the dove tail 8, formed upon the upper section 9 of the support. When connected, the sections 1 and 9 of the supports represent a lion's head as shown in the drawings, but it is to be understood that these sections may be made in any desired shape, form or of any desired material without departing from the spirit of this invention. The dove-tailed projection 8 snugly fits between the arms 6 and 7 and its rear surface is flat for facial abutment with the wall or other support to which the section 1 of the support is attached. The under surface or bottom of the section 9 is shaped to snugly fit against the upper inclined face 3 of the attaching section 1 and if desired, this under surface of the section 9 may be provided with a recess or cut-out portion 10 positioned to receive the head of a screw, nail or the like as indicated at 5 in case the countersink 4 would not entirely receive the head of the attaching member. If it is so desired a pair of diagonally extending pins 11 may be provided which extend diagonally through the arms 6 and 7 into the dove-tailed projections 8 to prevent vertical movement of the sections 9 with respect to the section 1 after the device has once been assembled.

Figure 1:
Figure 1 is a side elevation of the improved support.
Figure 2:
Fig. 2 is a face elevation of the support.
Figure 3:
Fig. 3 is a vertical section on the line 3—3 of Fig. 2.
Figure 5:
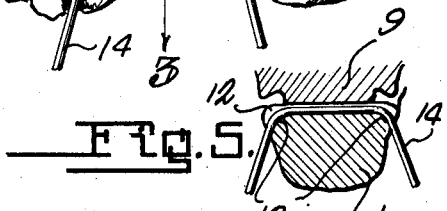
Fig. 5 is a fragmentary vertical section on the line 5—5 of Fig. 1.

The section 1 is provided with a transversely extending recess or groove 12 which opens out in the upper inclined face 3 thereof near its outer free end. The end portions of this groove are rounded as shown at 13 in Fig. 5 of the drawings and the groove is provided to receive a portion of the picture wire or cord 14 to support a picture or analogous article from the supporting device. When the section 9 is properly connected to the section 1 the under surface or the bottom of the upper section 9 will engage over and form a closure for the major portion of the groove 12 preventing accidental movement of the cord or wire 14 from the groove.

In use, the section 1 is first attached to the wall at the desired point or to some other desired support. The wire 14 is placed in the groove 12 after which the section 9 is positioned so that the dove tailed projection 8 thereon will engage between the facing beveled edges of the arms 6 and 7 and it is then lowered until its lower inclined surface engages the upper inclined face 3 of the section 1. The weight of the section 9 will hold it in place, against accidental disconnection with the section 1. However, if it is desired to insure against accidental disconnection of the sections 1 and 9, pins, screws or analogous devices 11 may be driven diagonally through the arms 6 and 7 and into the extension 8, suitable openings provided for their reception in case the support is made of metal or other material which will not permit the driving of the pins, nails or the like 11 therethrough.

In Figs. 6, 7 and 8 of the drawings, a modified form of the invention is shown, this form is particularly adapted for supporting plaques or analogous articles upon a wall or permanent support and it includes an attaching section 20 which is provided with a plurality of diagonal openings 21 adapted to receive therethrough nails, screws or analogous attaching members as indicated at 22 in Fig. 8. The member 20 is preferably rectangular in shape and is provided with a plurality of cut out portions indicated at 23 which open out at one longitudinal edge thereof. The sides of these openings 23 are beveled as indicated at 24 so as to provide dove-tailed recesses for receiving the dove-tailed extensions 25 formed upon the plaque 26. The extensions 25 are formed upon the plaque 26 as clearly shown in Figs. 6 and 8 of the drawings and they are of such size as to snugly fit within the recesses 23 to connect the plaques 26 to the attaching plate 20. As shown in Fig. 8 of the drawings, the inner surface of the plaque 26 will lie in facial abutment with the outer surface of the attaching plate 20 to prevent any movement of either of the plaques relative to the attaching plate, thereby maintaining the plaque rigidly in its proper position.

Changes in details may be made without departing from the spirit of this invention, but;

I claim:

1. In a support as specified, the combination of an attaching section, an artistic section, means slidably connecting said artistic section to said attaching section, said attaching section provided with a groove in its upper face adapted to receive a wire, said artistic section adapted to rest upon the upper surface of the attaching section and prevent accidental movement of the picture wire out of said groove.

2. In a support as specified, the combination of an attaching section, a pair of spaced arms, formed upon said attaching section and having their inner facing edges beveled to form a dove-tailed recess, means formed on the attaching section for receiving a picture wire, an upper section, a dove-tailed extension formed upon the rear side of said upper section and adapted to slide into said recess to slidably connect the upper section and the attaching section and means carried by the upper section arranged to prevent displacement of the wire from the attaching section.

3. In a support as specified, the combination of an attaching section, a pair of spaced arms formed upon said attaching section and having their inner facing edges beveled to form a dove-tailed recess, an upper section, a dove-tailed extension formed upon the rear side of said upper section and adapted to slide into said recess to slidably connect the upper section and the attaching section, the upper surface of said attaching section being inclined, said attaching section being provided near its outer edge with a transverse groove in its upper face adapted to receive a picture wire, the lower end of said upper section resting upon said inclined face to prevent accidental removal of a picture wire from said groove.

4. In a support, the combination with an attaching plate adapted to be secured to a support, the plate having a vertical groove formed therein extending downwardly from its upper end to a point short of its lower end, a removable section associated with the attaching section, said removable section having a tongue arranged to fit in said groove, the attaching plate having an outwardly extending extension formed thereon below the groove arranged to receive a picture wire, and the removable section being arranged to rest on said section to prevent displacement of the wire.

5. In a support, the combination with an attaching plate adapted to be secured to a support, the plate having a dove-tailed groove formed therein extending downwardly from its upper end to a point short of its lower end, an outwardly extending extension formed on the plate below said groove, a removable section having a tongue arranged to slidably engage said groove, the removable section being arranged to rest upon said extension, and means arranged to engage the section to prevent accidental movement of the same in relation to each other.

6. The combination with an attaching plate, means for securing the plate to a support, a removable ornamental section slidably associated with the attaching plate and adapted to overlie the securing means therefor, when in operative position.

7. In a device of the class described, the combination with an attaching plate, means for securing the plate to a support, a removable ornamental section slidably associated with the attaching plate and adapted to overlie the securing means therefor when in operative position, and means formed on the attaching plate for limiting the downward movement of the removable section thereon.

HARRY E. GREEN.